Sept. 25, 1962 G. T. JOHNSON 3,055,345
HYDRAULIC LATCH SYSTEM FOR FLUID MOTOR OPERATOR
Filed Feb. 2, 1961 2 Sheets-Sheet 1

INVENTOR.
GEORGE T. JOHNSON
BY
ATTORNEYS

INVENTOR.
GEORGE T. JOHNSON

United States Patent Office 3,055,345
Patented Sept. 25, 1962

3,055,345
HYDRAULIC LATCH SYSTEM FOR FLUID MOTOR OPERATOR
George T. Johnson, Mansfield, Ohio, assignor to Shafer Valve Company, Mansfield, Ohio, a corporation of Ohio
Filed Feb. 2, 1961, Ser. No. 86,610
11 Claims. (Cl. 121—40)

The invention relates generally to fluid motor piston operators for controlling pipe line valves, preferably using the line pressure as the power fluid to actuate the fluid motor.

More particularly, the invention relates to a hydraulic latch system whereby the motor piston may be maintained in an intermediate position to maintain the pipe line valve in partly open position.

Such a hydraulic latch system is disclosed in U.S. Patent No. 2,896,582 in which a relief valve held closed by predetermined spring pressure is used to prevent exhaust flow from the fluid motor due to drift of its piston, and to permit normal exhaust flow by overcoming the spring pressure and by-passing a separate check valve which permits flow in the opposite direction to the motor.

It is an object of the present invention to provide an improved hydraulic latch system for fluid motor valve operators.

A more specific object is to provide an improved hydraulic latch system which acts to relieve predetermined high pressure within the motor when the motor is not operating and which permits normal operation of the motor at relatively low pressures.

Another object is to provide an improved hydraulic latch which is capable of accurate adjustment to open at predetermined high pressures.

A still further object is to provide an improved hydraulic latch which utilizes a relatively lightweight spring to resist high pressures when the motor is not operating, and which does not require an additional valve to control normal flow to the motor when operating.

These and other objects are accomplished by the combinations and arrangements comprising the present invention, a preferred embodiment of which is shown by way of example in the accompanying drawings.

Figure 1:
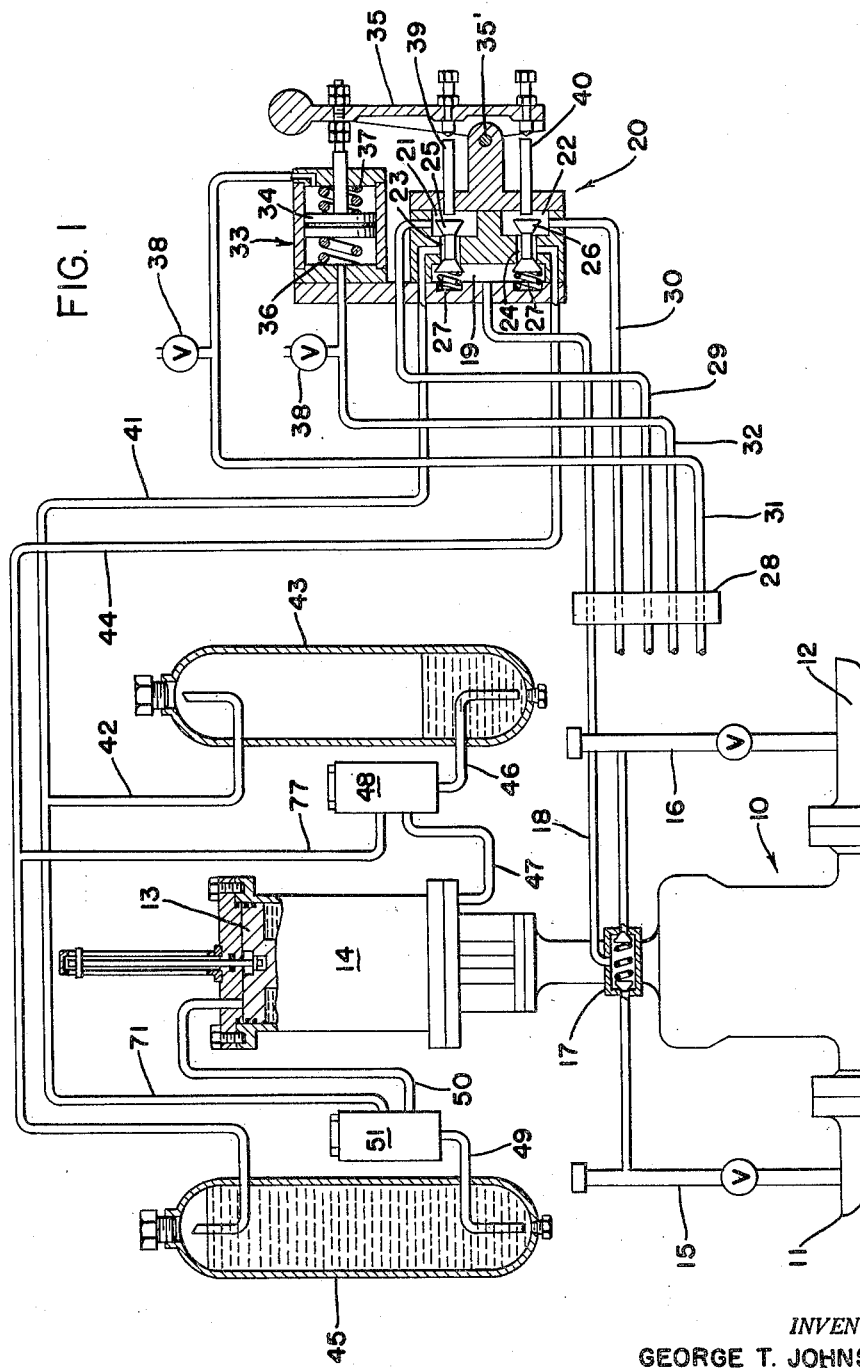
FIG. 1 is a schematic view showing a fluid motor operator for a gate valve in a pipe line and the control system for automatically operating the motor using pressure from the pipe line, the piston of the fluid motor being raised.

While the improved hydraulic latch system is shown applied to a fluid motor operator to reciprocate a piston operating a gate valve in a pipe line, it is to be understood that fluid pressure from any suitable source may be used and that the operator may have an oscillating piston operating a rotory valve.

Referring to the drawings, a gate valve indicated generally at 10 is connected between sections 11 and 12 of the pipe line, the gate element of the valve being connected in a usual manner to the piston 13 of the fluid motor 14 for opening and closing the gate valve by reciprocating the piston.

The pipe line sections 11 and 12 are preferably connected by tap lines 15 and 16, respectively, to opposite ends of a double check valve 17, and a power supply conduit 18 is connected at one end to said double check valve between its valve elements and at its other end to the pressure chamber 19 of a control valve indicated generally at 20. The double check valve provides for supplying fluid pressure from the pipe line on either side of the valve 10 in the event of a line break on the other side.

The control valve 20 has exhaust chambers 21 and 22 communicating with pressure chamber 19 through ports 23 and 24, respectively. Double headed poppet valves 25 and 26 are movable within ports 23 and 24, respectively, for alternately closing one end or the other of said ports, and springs 27 normally hold said poppet valves in the position shown in FIG. 1, closing off the pressure chamber. Between their ends the ports 23 and 24 are connected by conduit systems to opposite ends of fluid motor 14.

For convenience of installation and maintenance, all control lines may pass through a junction block 28 where connections are made. Exhaust conduits 29 and 30 lead from exhaust chambers 21 and 22, respectively, to the junction block, and pilot supply lines 31 and 32 lead from the junction block to opposite ends of a pilot motor 33 for operating the control valve 20. If desired, the lines 31 and 32 may be connected to the pipe line to be responsive to variations in pressure therein.

The pilot motor 33 has a piston 34 for operating the handle 35 of control valve 20, and the piston is normally maintained in neutral by springs 36 and 37. The lines 31 and 32 have adjustable orifice exhaust valves 38 therein for relieving the pressure on either side of the piston to allow it to be returned to neutral following actuation of the handle 35. The handle is pivoted at 35', for actuating one or the other of the valve rods 39 and 40 to open one or the other of the poppet valves 25 and 26 and control the flow of fluid pressure from pressure chamber 19 to one end or the other of the fluid motor cylinder 14 while exhausting it from the opposite end.

The construction and arrangement of the control valve 20 and the pilot motor 33, per se form no part of the present invention.

The conduit system connecting the pressure chamber 19 of control valve 20 to the lower end of fluid motor 14 includes a conduit 41 connected to port 23 and a conduit 42 connected to the upper end of an oil tank 43. The conduit system connecting the pressure chamber 19 to the upper end of fluid motor 14 includes a conduit 44 connecting the port 24 to the upper end of an oil tank 45. Preferably, the oil tanks are connected in the supply lines to the motor where gas under pressure is the fluid pressure supply, because oil is substantially incompressible and the flow of oil under pressure into one end of the fluid motor and out of the other end is more effectively controlled.

The lower end of oil tank 43 is connected by conduits 46 and 47 through the improved hydraulic latch 48 to the lower end of fluid motor 14, and the lower end of oil tank 45 is connected by conduits 49 and 50 through a similar hydraulic latch 51 to the upper end of fluid motor 14. Thus, the conduit system connecting pressure chamber 19 to the lower end of the motor 14 comprises conduits 41 and 42, oil tank 43, and conduits 46 and 47. The conduit system connecting pressure chamber 19 to the upper end of the motor comprises conduit 44, oil tank 45, and conduits 49 and 50.

Figure 2:
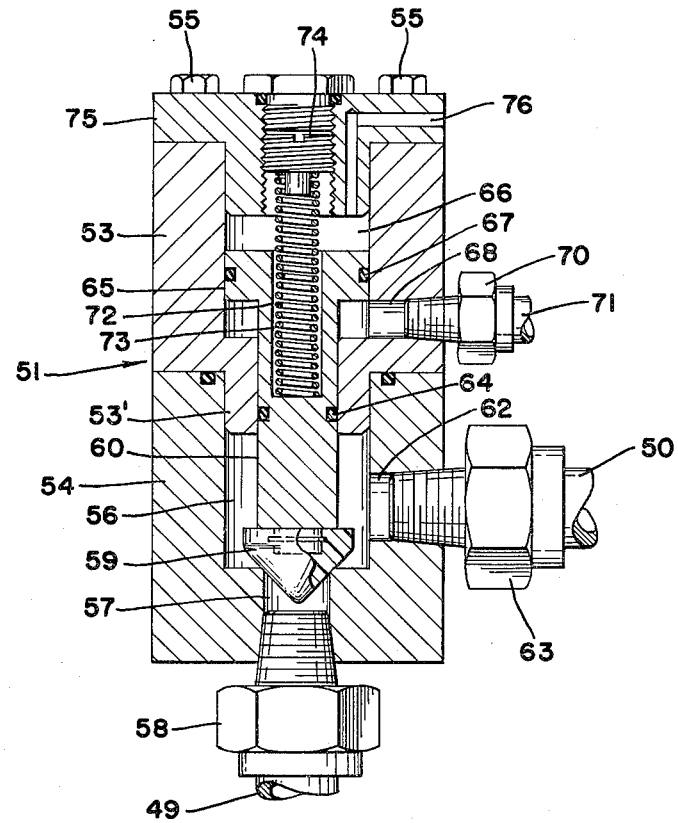
FIG. 2 is an enlarged cross sectional view of one of the improved hydraulic latches connected in the system to opposite sides of the fluid motor.

Referring to FIG. 2, hydraulic latch 51 is shown in cross section, and latch 48 is identical in construction and operation. The latch 51 comprises an outer tubular body composed of two sections 53 and 54 interfitting end-to-end and connected together by screw studs 55. The lower section 54 has a valve chamber 56 therein and a port 57 extends through the bottom wall of the chamber into the chamber. A conduit connector 58 is screwed into said port and connects with conduit 49. A valve element or head 59 within valve chamber 56 seats on the upper end of said port.

The valve head 59 is preferably of resilient material to make a tight seal with port 57, and is mounted on the lower end of a stem 60 which is slidable in a bore in the bottom wall 53' of body section 53. The upper annular surface of the valve head 59 is constructed to be slightly less in area than the vertically projected annular conical area of its under surface which is exposed within chamber 56 when the head is seated on the port 57. In other words, the upper exposed pressure effective area of the head is slightly less than the lower pressure effective area so that pressure in chamber 56 will urge the valve toward open position. A port 62 is provided in the side wall of chamber 56, and a conduit connector 63 screwed in said port is connected to conduit 50 which leads to the upper end of motor 14.

An O-ring seal 64 is preferably provided around the stem 60 within the bore, and the upper end of the stem has a piston 65 slidable in a chamber 66 within the upper section 53. An O-ring seal 67 is provided around the piston in contact with the wall of chamber 66. A port 68 is provided in the side wall of chamber 66 to communicate with the chamber on the underside of piston 65. A conduit connector 70 screwed in port 68 connects with a conduit 71, and conduit 71 is connected to the conduit system connected to the lower end of motor 14 (FIG. 1).

The piston 65 has a bore 72 opening from its upper end and a compression spring 73 is held under compression in said bore by an adjusting nut 74 screwed into a cap 75 held on the top of body section 53 by the screw studs 55. A vent 76 in the cap provides communication between the upper part of chamber 66 and atmosphere.

In the hydraulic latch 48 port 57 is connected to conduit 46, port 62 is connected to conduit 47 which leads to the lower end of motor 14, and port 68 is connected to conduit 77 which is connected to conduit 44 of the conduit system connected to the upper end of the motor.

In the operation of the improved system, if pressure is supplied through conduit 44, the oil pressure in conduit 49 lifts valve 59 in body 51 off its seat against the pressure of spring 72 and allows oil under pressure to flow through conduit 50 to the top of motor 14 to force the piston 13 downward. At the same time the pressure in conduit 77 connected to conduit 44 lifts piston 65 in body 48 against the spring 72 therein, opening the valve and allowing oil from the bottom of motor 14 to exhaust through conduits 47 and 46 into the bottom of tank 43, and thence through conduits 42 and 41 to exhaust chamber 21 of the control valve. When fluid pressure is supplied through conduit 41, flow is reversed to raise piston 13 and the exhaust flow is conducted to exhaust chamber 22.

Should the piston 13 be stopped intermediate its top and bottom position, latch 48 acts to maintain it in that position because at the low exhausting pressure of the oil in conduit 47 the spring pressure holding the valve 59 closed is greater than the differential pressure due to the difference in pressure effective areas of the valve tending to open the valve.

When the fluid motor is subjected to extreme temperature changes causing expansion and contraction of the oil therein, means must be provided to relieve the pressure due to expansion to prevent bursting of the cylinder or the conduits. However, this relief should not occur at relatively low pressures because subsequent contraction causes unbalance of the oil in the system and improper drifting of the piston of the motor 14 to open or close the valve.

With the present hydraulic latch providing for the expanding oil from the motor to enter the valve chamber 56 above the valve 59, the differential pressure effective areas thereof can be predetermined to require a relatively high pressure to open the valve against the spring pressure, and a relatively light spring can be adjusted to provide for accurately setting the predetermined opening pressure required.

Accordingly, the motor can be operated to open or close the pipe line valve normally at low pressures, with the pressure supply acting to open the latch on the exhaust side of the motor. The latch acts to prevent drifting of the piston in an intermediate position, and also acts to permit pressure relief at predetermined high internal motor pressures due to oil expansion, without excessive wear on the valve, because the pressure forcing the valve against its seat is largely counteracted by the effective pressure in the opposite direction.

What is claimed is:

1. In combination with a fluid motor operator having two conduit systems for alternately supplying and exhausting fluid pressure to and from opposite ends of said motor, a hydraulic latch body having a valve chamber and a first port connecting said valve chamber to one of said conduit systems, a piston chamber in said body separated from said valve chamber, a piston movable in said piston chamber and having a valve head in said valve chamber, a spring urging said valve head into closing relation with said port, said valve head in closed position having opposed differential effective areas exposed in said valve chamber so proportioned to each other that pressure in said valve chamber reacts against said spring, a second body port connecting said valve chamber to one end to said motor, and a third body port connecting said piston chamber to said other conduit system, for moving said piston to open said first port when said other conduit system is supplying fluid pressure to the other end of the motor.

2. In combination with a fluid motor operator having two conduit systems for alternately supplying and exhausting fluid pressure to and from opposite ends of said motor, a hydraulic latch body having a valve chamber and a first port connecting said valve chamber to one of said conduit systems, a piston chamber in said body separated from said valve chamber, a piston movable in said piston chamber and having a valve head in said valve chamber, said valve head having a top surface and a bottom surface for closing said port, a spring urging said valve head against said port, said top and bottom surfaces in closed position having opposed differential effective areas exposed in said valve chamber so proportioned to each other that pressure in said valve chamber reacts against said spring, a second body port connecting said valve chamber to one end of said motor, and a third body port connecting said piston chamber to said other conduit system, for moving said piston to open said first port when said other conduit system is supplying fluid pressure to the other end of the motor.

3. In combination with a fluid motor operator having two conduit systems for alternately supplying and exhausting fluid pressure to and from opposite ends of said motor, a hydraulic latch body having a valve chamber and a first port connecting said valve chamber to one of said conduit systems, a piston chamber in said body separated from said valve chamber, a piston movable in said piston chamber and having a valve head in said valve chamber, a spring urging said valve head into closing relation with said port, means accessible exteriorly of said body for adjusting the pressure of said spring, said valve head in closed position having opposed differential effective areas exposed in said valve chamber so proportioned to each other that pressure in said valve chamber reacts against said spring, a second body port connecting said valve chamber to one end of said motor, and a third body port connecting said piston chamber to said other conduit system, for moving said piston to open said first port when said other conduit system is supplying fluid pressure to the other end of the motor.

4. In combination with a fluid motor operator having two conduit systems for alternately supplying and exhausting fluid pressure to and from opposite ends of said motor, a hydraulic latch body having a valve chamber and a first port connecting said valve chamber to one of said conduit systems, a piston chamber in said body separated from said valve chamber, a piston movable in said piston chamber and having a valve head in said valve chamber, said valve head having a top surface and a bottom surface for closing said port, a spring urging said valve head against said port, means accessible exteriorly of said body for adjusting the pressure of said spring, said top and bottom surfaces in closed position having opposed differential effective areas exposed in said valve chamber so proportioned to each other that pressure in said valve chamber reacts against said spring, a second body port connecting said valve chamber to one end of said motor, and a third body port connecting said piston chamber to said other conduit system, for moving said piston to open said first port when said other conduit system is supplying fluid pressure to the other end of the motor.

5. In combination with a fluid motor operator having two conduit systems for alternately supplying and exhausting fluid pressure to and from opposite ends of said motor, a hydraulic latch body having a valve chamber and a first port connecting said valve chamber to one of said conduit systems, a valve head movable in said valve chamber for closing and opening said port, said valve head in closed position having opposed differential effective areas exposed in said valve chamber so proportioned to each other that pressure in said chamber acts to open said valve, a spring urging said valve head against said port, and a second body port connecting said valve body to one end of said motor, whereby incoming fluid pressure from said first port opens said valve against said spring, and exhausting fluid from the motor to the second port is trapped by said valve until differential pressure thereon overcomes said spring.

6. In combination with a fluid motor operator having two conduit systems for alternately supplying and exhausting fluid pressure to and from opposite ends of said motor, a hydraulic latch body having a valve chamber and a first port connecting said valve chamber to one of said conduit systems, a valve head movable in said valve chamber for closing and opening said port, said valve head having a top surface and a bottom surface for closing said port, said top and bottom surfaces in closed position having opposed differential effective areas exposed in said valve chamber so proportioned to each other that pressure in said chamber urges the valve toward open position, a spring urging said valve head against said port, and a second body port connecting said valve body to one end of said motor, whereby incoming fluid pressure from said first port opens said valve against said spring, and exhausting fluid from the motor to the second port is trapped by said valve until differential pressure thereon overcomes said spring.

7. In combination with a fluid motor operator having two conduit systems for alternately supplying and exhausting fluid pressure to and from opposite ends of said motor, a hydraulic latch body having a valve chamber and a first port connecting said valve chamber to one of said conduit systems, a valve head movable in said valve chamber for closing and opening said port, said valve head in closed position having opposed differential effective areas exposed in said valve chamber so proportioned to each other that pressure in said chamber acts to open said valve, a spring urging said valve head against said port, means accessible exteriorly of said body for adjusting the pressure of said spring, and a second body port connecting said valve body to one end of said motor, whereby incoming fluid pressure from said first port opens said valve against said spring, and exhausting fluid from the motor to the second port is trapped by said valve until differential pressure thereon overcomes said spring.

8. In combination with a fluid motor operator having two conduit systems for alternately supplying and exhausting fluid pressure to and from opposite ends of said motor, a hydraulic latch body having a valve chamber and a first port connecting said valve chamber to one of said conduit systems, a valve head movable in said valve chamber for closing and opening said port, said valve head having a top surface and a bottom surface for closing said port, said top and bottom surfaces in closed position having opposed differential effective areas exposed in said valve chamber so proportioned to each other that pressure in said chamber urges the valve toward open position, a spring urging said valve head against said port, means accessible exteriorly of said body for adjusting the pressure of said spring, and a second body port connecting said valve body to one end of said motor, whereby incoming fluid pressure from said first port opens said valve against said spring, and exhausting fluid from the motor to the second port is trapped by said valve until differential pressure thereon overcomes said spring.

9. A hydraulic latch mechanism for a fluid motor system, including a valve body and a movable valve member which is resiliently biased for a valve head of the valve member to engage a valve seat through which the fluid under pressure can be admitted to the valve chamber, the valve chamber being connected to a working chamber of the fluid motor, the movable valve member being provided by a piston which extends in sealed relationship through a bore of the valve body and extends externally of the valve chamber, the piston having an annular end face which is at all times exposed to the interior of the valve chamber, the annular end face being operative to produce an axial force acting to move the valve member in a valve opening direction against the bias imposed on the valve member by a spring in the event that the static pressure within the valve chamber exceeds a predetermined maximum pressure determined by the bias imposed by said spring.

10. A hydraulic latch mechanism according to claim 9, in which the valve member is operatively connected to a piston which is operable within a piston chamber of the valve body to which fluid under pressure can be supplied to move the valve member in a direction for a valve head of the valve member to be moved away from the valve seat.

11. A hydraulic latch mechanism according to claim 10 for a fluid motor which includes opposed working chambers, in which a latch mechanism is associated with each working chamber of the fluid motor, the piston chamber of each valve body being connected to the fluid supply line to the valve seat of the other valve body, whereby a rise in pressure in the supply line to the valve seat of one of the valve bodies is effective to move the valve member of the other latch mechanism in a valve opening direction.

References Cited in the file of this patent
UNITED STATES PATENTS

| | | |
|---|---|---|
| 404,523 | Elmes | June 4, 1889 |
| 2,456,236 | Acton | Dec. 14, 1948 |
| 2,896,582 | Justice | July 28, 1959 |